United States Patent
Brayman

[15] 3,636,666
[45] Jan. 25, 1972

[54] SHARPENER FOR SHARPENING ROTARY LAWN MOWER BLADES

[72] Inventor: Jay H. Brayman, P.O. Box 2, Dorsey, Ill. 62021

[22] Filed: July 1, 1970

[21] Appl. No.: 51,524

[52] U.S. Cl.....................................51/250, 56/250, 76/82.2
[51] Int. Cl.........................................................B24b 19/00
[58] Field of Search.................51/250, 246; 56/250; 76/82.1

[56] References Cited

UNITED STATES PATENTS

| | | | |
|---|---|---|---|
| 2,826,032 | 3/1958 | Hayes | 51/250 |
| 3,136,107 | 6/1964 | Spear | 51/250 |

*Primary Examiner*—William R. Armstrong
*Attorney*—Koenig, Senniger, Powers and Leavitt

[57] ABSTRACT

A sharpener for sharpening the blades of a multiple-blade rotary power lawn mower without removing the blades from the mower, utilizing the mower engine for rotating the blades for sharpening them, having a base over which the mower is moved and a plurality of sharpening stones secured on the base in position for sharpening the cutting edges of all the blades of the mower at one time when the mower is moved into a blade-sharpening position over the base and the blades are lowered for wiping contact with the stones.

10 Claims, 5 Drawing Figures

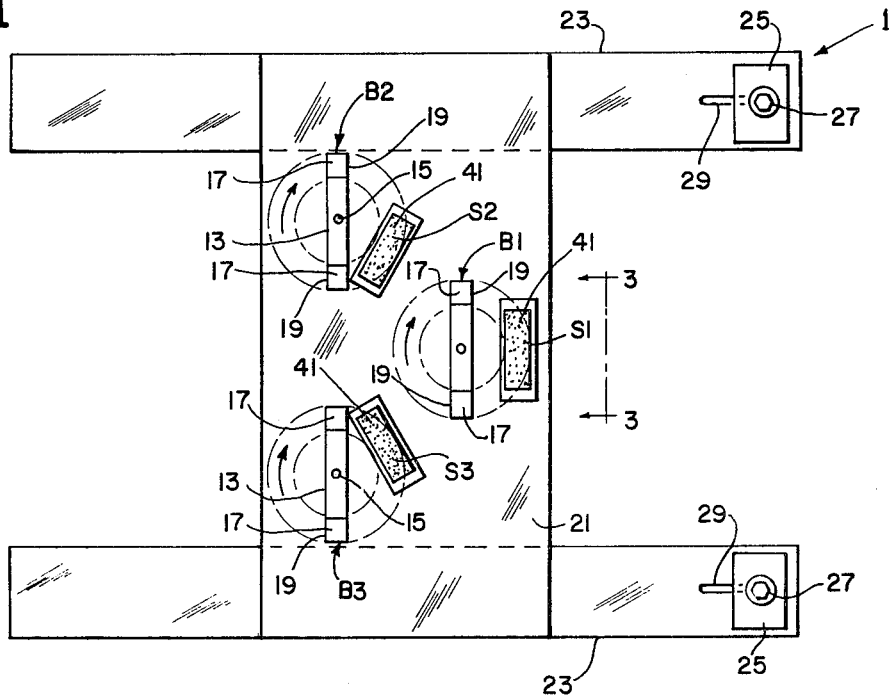
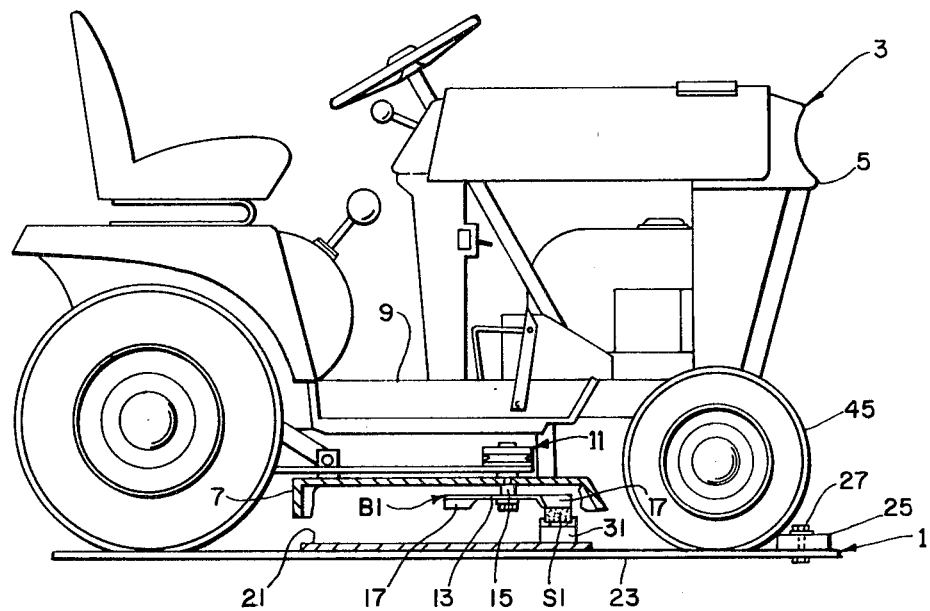

3,636,666

SHARPENER FOR SHARPENING ROTARY LAWN MOWER BLADES

BACKGROUND OF THE INVENTION

This invention relates to a sharpener for sharpening rotary lawn mower blades, and more particularly to a sharpener for sharpening in situ the blades of a multiple-blade rotary power lawn mower (either a manually propelled or a riding mower) or a single-blade riding mower, without removing the blade or blades from the mower.

Reference is made to my copending application Ser. No. 860,979, filed Sept. 25, 1969, entitled Rotary Mower Blade and Sharpening Apparatus, relating to my earlier invention involving apparatus for sharpening in situ the blade of a single-blade rotary power lawn mower, particularly a manually propelled mower, and a special blade adapted to be sharpened thereby. The apparatus shown therein is quite satisfactory for manually propelled rotary lawn mowers with a single blade, but is not particularly suitable for either manually propelled or riding multiple-blade mowers (e.g., double-blade and triple-blade mowers) or single-blade riding mowers, and I am not aware of any prior satisfactory sharpener means for in situ sharpening of the blades of such mowers.

SUMMARY OF THE INVENTION

Among the several objects of this invention may be noted the provision of a sharpener for in situ sharpening of the blades of a multiple-blade rotary power lawn mower, either a manually propelled or riding mower, or for sharpening the blade of a single-blade riding mower; the provision of such a sharpener wherein the blades are sharpened from below; and the provision of such a sharpener which is of economical construction, utilizing the mower engine for power, and utilizing the up and down adjustment of the mower blades for sharpening contact.

In general, a sharpener of this invention is adapted to sharpen a blade of a rotary power lawn mower wherein the blade is mounted for rotation on a vertical axis and is adjustable up and down relative to the mower chassis for cutting height adjustment, the blade having cutting edges constituted by lower leading edges of end portions thereof. The sharpener comprises a generally flat base adapted to rest on the ground or on a floor, the mower being movable to a position wherein the blade is above the base. At least one sharpening stone is secured on the base in a position for wiping contact of the said cutting edges of the blade with the upper surface of the stone when the mower is moved into a blade-sharpening position over the base wherein the circular path of the said cutting edges of the blade registers with the stone and the blade is adjusted downward for such contact. The sharpener further includes stop means associated with the base engageable by the mower for locating it in its said blade-sharpening position. Other objects and features will be in part apparent and in part pointed out hereinafter.

BRIEF DESCRIPTION OF THE DRAWINGS

FIG. 1 is a plan of a sharpener of this invention for sharpening the three blades of a triple-blade rotary riding mower, showing the blades in solid lines and the circular paths of their cutting edges in phantom;

FIG. 2 is a view in elevation with parts broken away and shown in section of the riding mower on the FIG. 1 sharpener;

Corresponding reference characters indicate corresponding parts throughout the several views of the drawings.

DESCRIPTION OF THE PREFERRED EMBODIMENT

Figure 3:
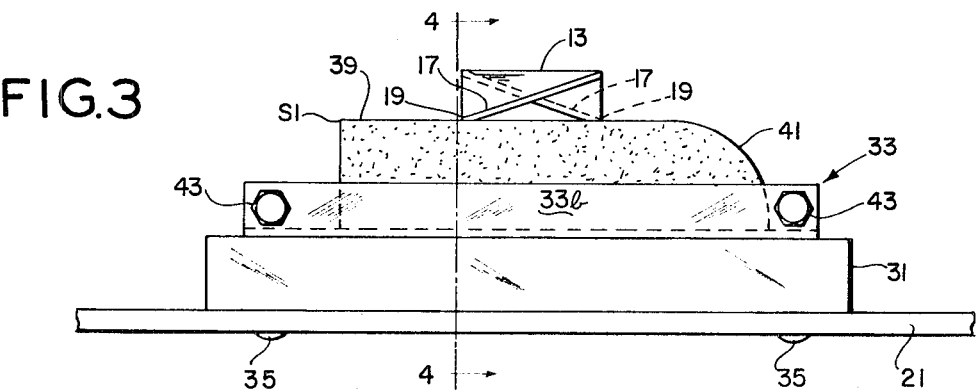
FIG. 3 is an enlarged elevation on line 3—3 of FIG. 1 showing one of the sharpening stones of the sharpener, also showing a blade being sharpened.

Referring to the drawings, first more particularly to FIGS. 1 and 2, there is generally indicated at 1 a sharpener of this invention especially adapted for sharpening the blades of a three-blade rotary power lawn mower generally designated 3. As shown, the mower 3 is a riding mower, comprising a tractor 5 carrying a blade guard or housing 7 below the chassis 9 of the tractor. Three blades each generally denoted by the reference character B are mounted for rotation on vertical axes in this blade guard, and are driven as is conventional by a power takeoff from the engine of the tractor as indicated generally at 11. One of these blades, designated B1, appears in FIG. 2, the other two, designated B2 and B3, appear with B1 in FIG. 1. The blade guard 7, carrying the three blades B1–B3, is adjustable up and down in well-known manner relative to the chassis 9 for cutting height adjustment.

Each of the blades B1–B3 is of a type as disclosed in my said copending U.S. Pat. application Ser. No. 860,979 comprising a flat bar 13 adapted to be attached to the lower end of a vertical shaft 15 with the bar in horizontal position, having end portions 17 bent downward from the plane of the bar in opposite directions to provide downwardly offset leading cutting edges 19 on opposite sides of the bar (leading in the sense of direction of rotation of the blade), with each of these bent-down end portions bevelled on its underside along its leading edge to provide a sharp leading cutting edge 19 which is sharpenable from below.

The sharpener 1 comprises a generally flat base 21, which may comprise simply a rectangular panel of any suitable material (e.g., composition board, plywood or the like). This is shown as mounted on and secured to a pair of flat side rails 23 which are shown as extending forward (toward the right as viewed in FIGS. 1 and 2) and rearward (toward the left as viewed in FIGS. 1 and 2) from opposite sides of the base. Adjacent the forward ends of these rails are stops 25 which are adjustable lengthwise of the rails as by means of bolts 27 extending through elongate slots 29 in the rails. The rearwardly extending portions of the rails may be omitted, if desired.

As appears in FIG. 1, three sharpening stones S1, S2 and S3, for sharpening blades B1, B2 and B3 respectively, are mounted on the base. Each stone is secured on the base by means such as shown in detail in FIGS. 2–5 comprising a rectangular block 31 having a pair of clamp members thereon each designated 33 for clamping the sides of the stone. The block is secured to the base as by means of bolts 35. The clamp members 33 are angle irons having horizontal flanges 33a secured to the block as by screws 37 and vertical flanges 33b. The stone is of elongate rectangular form in plan and of rectangular cross section, its generally horizontal top surface 39 constituting a sharpening surface, and having a curved or rounded ramp portion 41 at one end constituting its trailing end leading up to the top sharpening surface 39. The stone fits between the vertical flanges 33b of the angle iron clamp members 33, bearing on the horizontal flanges 33a, and is clamped in place by means of clamp bolts 43 extending between the vertical flanges 33b outward of the ends of the stone at the ends of the clamp members. These bolts are tightened to bend flanges 33b toward one another to clamp the stone.

The blocks 31 carrying the stones S1, S2 and S3 held by the clamp members 33 are secured to the base 21 in position for wiping contact of the cutting edges 19 of the blades B1, B2 and B3, respectively, with the upper sharpening surfaces 39 of the stones when the mower 3 is driven into the blade-sharpening position such as shown in FIG. 2 on the base 21 wherein the circular path of the cutting edge of each blade registers with a respective stone, and the blade guard or housing 7 is adjusted downward relative to the mower for such contact. This position of the mower is determined by the engagement of its front wheels 45 with the stops 25 on the rails 23, the mower being driven on to the base so that its front wheels roll on the forward portions of the rails (which are spaced in accordance with the spacing of the front wheels 45 of the tractor) until they engage the stops.

Figure 4:
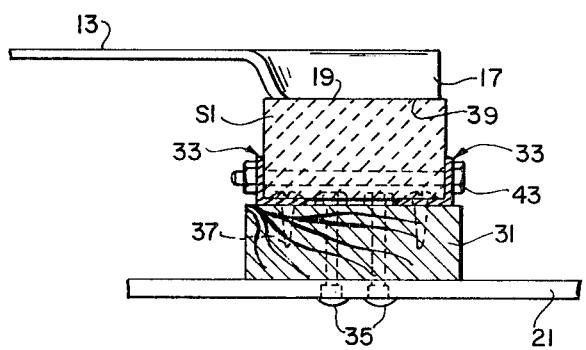
FIG. 4 is a vertical section on line 4—4 of FIG. 3.
Figure 5:
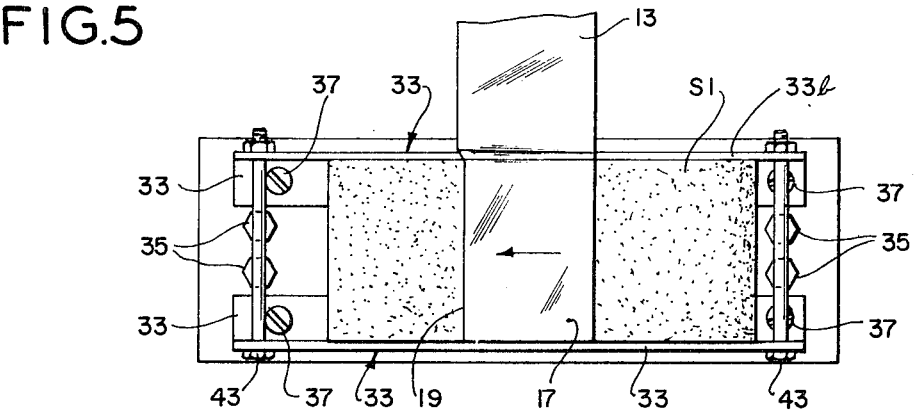
FIG. 5 is a plan of FIG. 3.

The mower is driven on to the base 21 and into its blade-sharpening position with the blade guard 7 and the blades raised so as to clear the stones S1–S3. Then the blade guard 7 and the blades are lowered into the position such as illustrated in FIGS. 2–4 for the stated wiping contact of the blade cutting edges 19 with the stones when the blades are power-driven by the mower motor. Each of the stones S1–S3 is secured on the base with its length generally tangent to the circular path of the cutting edges 19 of the respective blade B1–B3 (see FIG. 1), and with is curved ramp end 41 at its trailing end in respect to the direction of rotation of the respective blade. It will be observed that the weight of the tractor bearing down on the rails 23 holds the base 21 and the sharpening stones S1–S3 thereon steady. The stones S1–S3 may be readily shimmed up as they become worn, and, when completely worn, may be readily removed and replaced by loosening the bolts 43.

The arrangement of stones shown in FIG. 1 is only one of various different arrangements applicable to different three-blade mowers. It will be understood that the stones will be placed in different positions on base 21 for mowers with blades arranged different from the FIG. 1 arrangement; that only one stone need be used for a single-blade riding mower, and that two stones suitably arranged would be used for a two-blade mower. It will be further understood that the stones will be positioned clear of any depending flange, skirt or other element of the blade guard 7 so that, when the latter is lowered for sharpening of the blades, it will not hang up on a stone.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A sharpener for sharpening a blade of a rotary power lawn mower wherein the blade is mounted for rotation on a vertical axis and is adjustable up and down relative to the mower chassis for cutting height adjustment, said blade having cutting edges constituted by lower leading edges of end portions thereof, said sharpener comprising a generally flat base adapted to rest on the ground or on a floor, the mower being movable to a position wherein said blade is above the base, a sharpening stone for said blade secured on the base in a position for wiping contact of the said cutting edges of said blade with the upper surface of the stone when the mower is moved into a blade-sharpening position over the base wherein the circular path of the said cutting edges of said blade registers with said stone and said blade is adjusted downward for such contact, and stop means associated with the base engageable by the mower for locating it in its said blade-sharpening position.

2. A sharpener as set forth in claim 1 wherein the stone is of elongate rectangular form in plan and secured on the base in position with its length generally tangent to the circular path of said cutting edges of said blade.

3. A sharpener as set forth in claim 2 wherein said stone has a generally horizontal top sharpening surface with a ramp at its trailing end in respect to the direction of rotation of said blade leading up to said top sharpening surface.

4. A sharpener as set forth in claim 3 wherein said ramp is rounded.

5. A sharpener as set forth in claim 3 having means on the base for clamping the stone thereon.

6. A sharpener as set forth in claim 2 having rails at opposite sides of the base spaced for rolling thereover of the front wheels of a mower, said rails extending forward from the sides of the base, and said stop means being mounted on said rails adjacent their forward ends for engagement by the front wheels of the mower.

7. A sharpener as set forth in claim 6 wherein the stop means is adjustable lengthwise of the rails.

8. A sharpener as set forth in claim 6 for sharpening the blades of a multiple-blade rotary power lawn mower, having a plurality of said sharpening stones, each stone being secured on the base in a position for wiping contact of the said cutting edges of a respective blade with the upper surface of the stone when the mower is moved into its said blade-sharpening position.

9. A sharpener as set forth in claim 8 wherein each stone is of elongate rectangular form in plan and secured on the base in position with its length generally tangent to the circular path of the said cutting edges of the respective blade.

10. A sharpener as set forth in claim 9 wherein each stone has a generally horizontal top sharpening surface with a ramp at its trailing end in respect to the direction of rotation of the respective blade leading up to said top sharpening surface.

* * * * *